United States Patent
Toth et al.

(10) Patent No.: US 6,356,556 B1
(45) Date of Patent: Mar. 12, 2002

(54) MECHANISM FOR AUTOMATICALLY DETERMINING ISDN CHANNEL AVAILABILITY

(75) Inventors: Robert James Toth; Michael Scott Sansom, both of Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/037,640

(22) Filed: Mar. 10, 1998

(51) Int. Cl.$^7$ .............................................. H04B 7/212
(52) U.S. Cl. ........................ 370/442; 370/463; 370/524
(58) Field of Search ................................. 370/420, 437, 370/450, 458, 459, 462, 463, 514, 524, 532, 904, 522, 419, 421, 449, 485, 445, 447, 661; 714/462, 752

(56) References Cited

U.S. PATENT DOCUMENTS

| | | | | |
|---|---|---|---|---|
| 5,636,202 A | * | 6/1997 | Garney | 370/241 |
| 5,682,385 A | * | 10/1997 | Garcia | 370/458 |
| 5,719,870 A | * | 2/1998 | Baker | 370/463 |
| 5,740,169 A | * | 4/1998 | Eames | 370/362 |
| 5,771,236 A | * | 6/1998 | Sansom | 370/458 |
| 5,793,751 A | * | 8/1998 | Baker | 370/250 |
| 5,943,404 A | * | 8/1999 | Sansom | 379/93.06 |
| 6,018,529 A | * | 1/2000 | Toth | 370/463 |

* cited by examiner

*Primary Examiner*—Douglas Olms
*Assistant Examiner*—Ricardo M. Pizarro
(74) *Attorney, Agent, or Firm*—Allen, Dyer, Doppelt, Milbrath & Gilchrist, P.A.

(57) ABSTRACT

A software-based automated DS0 channel format analysis routine resident in a U-BRITE interface card's microcontroller solves the problem of potential misconfiguration of ISDN interface circuit cards, as may result from the failure to properly set DS0 time slot option switches to their intended ISDN channel assignments. When exercised, the routine automatically determines not only what DS0 channels are available at the remote ISDN circuit card, but also the order in which those DS0 channels are multiplexed by that remote card's circuitry. As a consequence, once the routine has run to completion, each ISDN interface card will contain the same DS0 time slot multiplexing scheme—corresponding to what has been manually configured at a remote card—even if the remote card's DS0 option switches were originally incorrectly set.

31 Claims, 2 Drawing Sheets

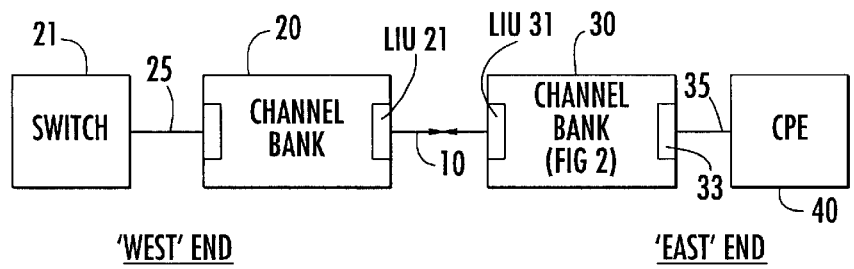
FIG. 1.
PRIOR ART
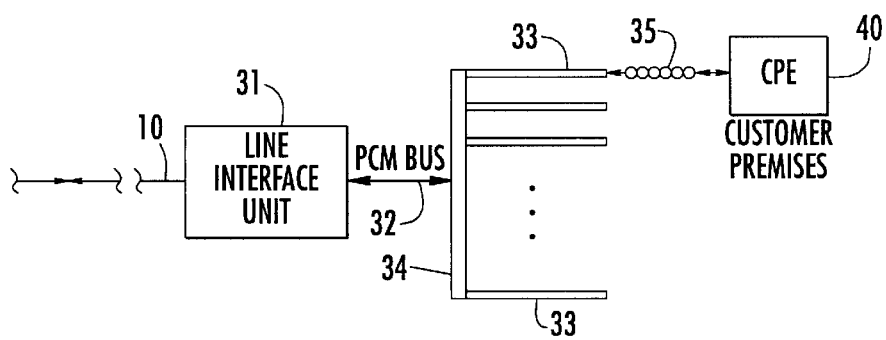
FIG. 2.
PRIOR ART
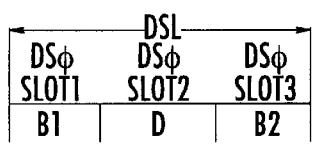 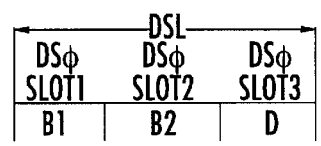 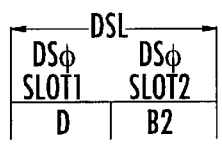
FIG. 3.           FIG. 4.           FIG. 5.

MECHANISM FOR AUTOMATICALLY DETERMINING ISDN CHANNEL AVAILABILITY

FIELD OF THE INVENTION

The present invention relates in general to communication networks, and is particularly directed to a mechanism for automatically determining the channel availability and DS0 time slot transmission assignment order of bearer and data channels that may be employed by ISDN interface circuit cards, such as U-Basic Rate-One Transmission Extension, or U-BRITE, ISDN circuit cards (also known in the industry as Basic Rate Interface Transmission Extension (U-BRITE) cards), for transporting a plurality of digital subscriber line (DSL) channels between geographically separated sites where ISDN channe-linterfacing channel banks are installed.

BACKGROUND OF THE INVENTION

Integrated services digital network (ISDN) communication systems enable telephone service providers to supply multiple types of signalling channels from a central office to a network termination interface at a customer premises site. An example of a reduced complexity 'extended distance' ISDN communication network architecture is diagrammatically illustrated in FIG. 1 as comprising a PCM communication link (such as a T1 data rate (1.544 Mb/s) optical fiber link) 10, through which a channel bank 20 at a 'west' end of the PCM link 10 transmits and receives signalling traffic with respect to a customer premises equipment (CPE) served by a channel bank 30 at a remote or 'east' end of the PCM link 10. The channel bank 20 at the west end is coupled by way of a link 25 to a central office switch 21 (such as a 5ESS switch manufactured by AT&T), and includes a line interface unit (LIU) 21 that is coupled to the PCM link 10. The channel bank 30 at the east end has an LIU coupled to the PCM link 10 and is coupled by way of a local loop 35 to a customer premises 40.

As shown in FIG. 2, in order to provide service to remote customers at customer premise sites 40, the channel bank 30 at the east end of the PCM link 10 has a plurality of U-BRITE circuit cards 33 installed in the channel bank unit's backplane 34. Each respective U-BRITE circuit card 33 is dedicated to providing extended ISDN service to remote customer premises equipment via a local loop 35, between the U-BRITE circuit card and digital communication equipment 40 installed at a respective customer premises.

A carrier system transceiver within a line interface unit (LIU) is operative, under control of an attendant communications control processor to transmit and receive standard 2B+D ISDN data traffic over the PCM digital data link 10. To interface digital subscriber loop (DSL) over the local loop (twisted pair) 35 to the customer premises equipment (CPE) 40, the U-BRITE circuit card 33 also includes a line transceiver and an associated line interface, which are also operative, under internal microprocessor control, to interface PCM data with the line interface unit 31 and to transmit and receive (basic rate 2B1Q) ISDN signals over the local loop 35 to and from CPE 40.

For transporting basic rate (2B+D) ISDN channels, the communications industry standard TR-TSY-000397 multiplexing format of a respective DSL channel conveyed by the T1 link is a DS0 byte triplet, accommodating a pair of bearer channel time slot octets B1 and B2 and a data channel time slot octet D. As diagrammatically illustrated in FIG. 3, within a respective DSL time slot, these three DS0 channel octets are typically ordered such that the bearer octet B1 is transmitted first, followed by the data octet D and then the second bearer octet B2, although the order may change depending upon the equipment vendor.

For example, some vendor's cards switch the order of the second and third octets, such that the data channel octet D immediately follows the second bearer channel octet B2, which immediately follows the first transmitted bearer channel octet B1, as shown in FIG. 4. Other vendor's cards switch the order of the first and second octets, such that the data channel octet D immediately precedes follows the first bearer channel octet B1, which immediately precedes the second bearer channel octet B2, as shown in FIG. 5. Regardless of the multiplexing order chosen, it is customary industry practice that the B1 channel is assigned a DS0 time slot ahead of that of the B2 bearer channel. Namely, the B2 channel, if used, will follow either directly after the D channel (as shown in FIG. 3), or after the B1 channel (as shown in FIGS. 4 and 5).

Regardless of the multiplexing order chosen, whether or not a respective DS0 octet/channel is enabled within a particular DSL time slot is customarily defined by manually presetting each of a set of three option switches—one for each channel (B1, B2 and D)—on the ISDN interface card. As a consequence, a not infrequent problem faced by a telecommunication service provider is the failure of an installer to have properly set the DS0 option switches on one or more ISDN interface (e.g., U-BRITE) cards in accordance with their intended ISDN channel assignments. Namely, unless the DS0 octet time slot assignment switches are properly optioned, then when the ISDN interface cards attempt to communicate with one another by way of a respective DSL time slot, they may encounter different DS0 time slot octet assignments, resulting in a lack of DS0 multiplexing synchronization between the two cards and transmission failure. A conventional solution to this problem, which is both labor intensive and time consuming, has been to dispatch a service technician to the remote site to physically examine and manually change the DS0 time slot option switch settings.

SUMMARY OF THE INVENTION

In accordance with the present invention, this conventional 'travelling technician' approach to solving the above-described DS0 time slot misconfiguration problem is successfully remedied by a software-based DS0 channel multiplexing format analysis routine exercised by the ISDN interface card's microcontroller, so as to automatically determine what DS0 channels are available at the remote ISDN circuit card and the order in which those DS0 channels are multiplexed by that remote card's circuitry.

For this purpose, the DS0 time slot monitoring routine of the present invention initially supplies a continuous stream of 'one'0 bits as data to be transmitted to each of the three available DS0 channels of the DSL time slot of interest, so that an error detection mechanism employed by the ISDN card, such as a cyclic redundancy check (CRC) mechanism, operating on each data stream will cause an 'all ones' associated code to be transmitted in the D octet portion of a respective DSL time slot of interest to a far end card that is potentially installed in the backplane card slot associated with the DSL time slot of interest.

A given assumption is that, if a remote ISDN card is installed for a DSL time slot of interest, at least one bearer channel—the B1 channel if only one bearer channel is used and the D channel will be enabled for that DSL time slot. The multiplexing order of the DS0 time slots may be initially established at a prescribed default order, such as B1–D–B2, as shown in FIG. 3, described above.

For this initial default order, the contents of the returned DSL time slot of interest are monitored to determine whether the second DS0 time slot contains the CRC data expected to be returned over the D channel from the far end card. If so, it is concluded that the second DS0 time slot is also used for D channel signalling by the far end card. The routine then proceeds to determine whether or not the second bearer channel B2 is enabled.

For this purpose, the all one's data previously asserted for the second bearer channel B2 is replaced with a prescribed (not all one's) data sequence, which causes the CRC operator in the transmitting card to compute a CRC code different from that for the original all one's sequence. This CRC code is then transmitted over the D channel to the far end circuit. The receiver at the far end card recalculates its own CRC code on the data. If the two CRC codes match, a far end blocking error code (FEB bit) returned by the far end card is set to a first binary state (e.g.,) indicating no error, and it is inferred that the DS0 channel assignments of the far end card correspond to those of the near end card, and the routine is terminated.

However, if the two CRC codes do not match, the far end blocking error bit is set to a second binary state (e.g., 0) indicating an error. It is then inferred that the third available DS0 channel is not used by the far end card for B2 bearer channel signaling, and the B2 channel is turned off.

If the initial monitoring step reveals that the second DS0 time slot is not used for D channel signalling by the far end card, then the multiplexing order is rearranged to assign the third DS0 channel for D channel signaling, and the contents of the third DS0 time slot are monitored to determine whether it contains the CRC data expected to be returned over the D channel from the far end card. If the third DS0 time slot is used for D channel signalling by the far end card, then it is known that the DS0 channel assignment order is the order B1–B2–D and the routine is terminated.

However, if the third DS0 time slot is not used for D channel signalling by the far end card, then it is inferred that the DS0 channel order employed by the far end card is D–B2 and the multiplexing order is rearranged. For this second alternative DS0 time slot order (D–B2), the contents of the first DS0 time slot of the returned DSL time slot of interest are monitored to determine whether that first DS0 time slot contains the CRC data expected to be returned over the D channel from the far end card.

If a D channel synchronization failure again occurs, it is concluded that there is no ISDN interface card installed at the remote site for a DSL time slot of interest, and the routine is reinitiated for the next DSL time slot. However, if the D channel is detected as the first time slot, then the B1 channel is turned off, and the all one's data previously asserted for the second bearer channel B2 is replaced with a prescribed (not all one's) data sequence. The D channel from the far end card is then monitored for the return of a new CRC code which should match that computed on the not all ones data due to the change in the data being placed on the B2 channel. If there are no far end blocking errors, it is inferred that the DS0 channel assignments of the far end card correspond to those currently used by the near end card, and the routine is terminated. However, if far end blocking errors are detected, it is inferred that the third available DS0 channel is not used by the far end card for B2 bearer channel signaling, and the B2 channel is turned off.

BRIEF DESCRIPTION OF THE DRAWINGS

FIG. 1 diagrammatically illustrates an example of a reduced complexity extended distance ISDN communication network;

FIG. 2 shows the configuration of a conventional U-BRITE circuit card of the type employed in the ISDN communication network of FIG. 1;

FIG. 3 diagrammatically illustrates a communications industry standard TR-TSY-000397 multiplexing format for transporting basic rate (2B+D) ISDN channels;

FIGS. 4 and 5 diagrammatically illustrate alternative multiplexing formats to that of FIG. 3 for transporting basic rate (2B+D) ISDN channels.

DETAILED DESCRIPTION

Figure 6:
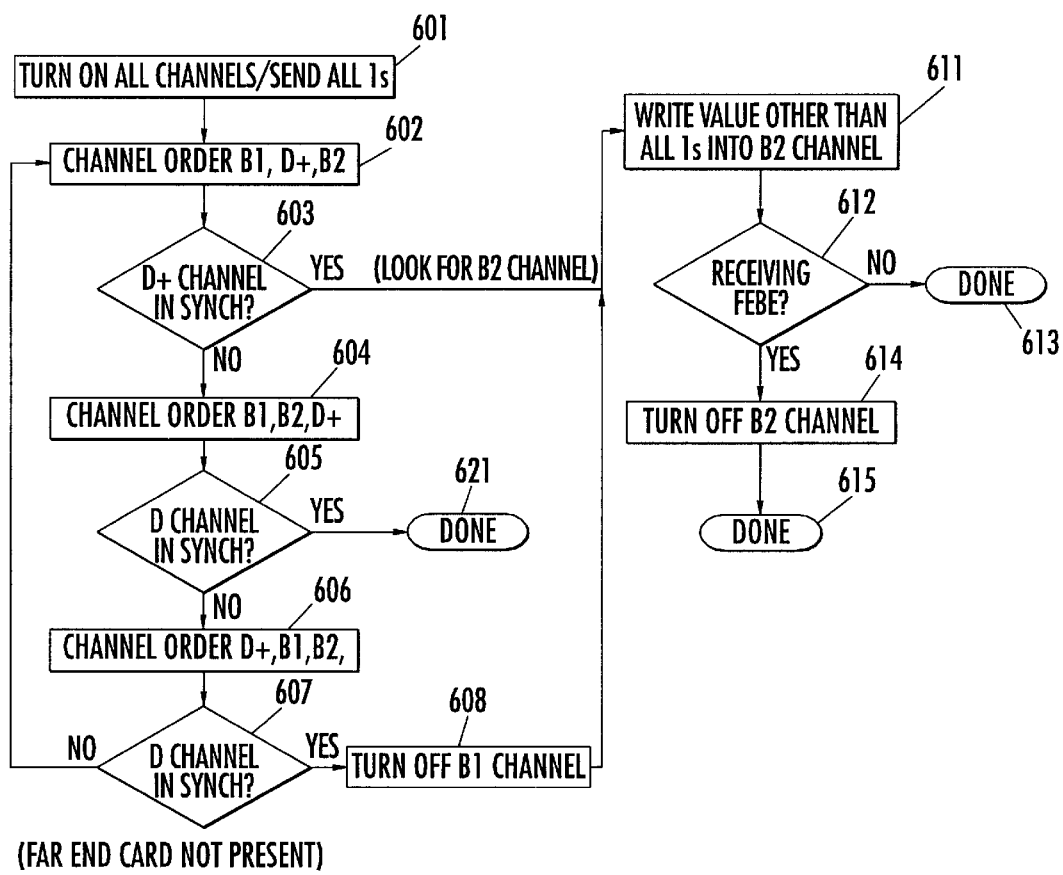
FIG. 6 shows the software flow executed by an ISDN (U-BRITE) card's microprocessor for automatically determining DS0 channel availability and transmission assignment order of bearer and data channels employed by an ISDN interface card installed remotely of the site containing the interrogating microprocessor.

Before describing in detail the new and improved DS0 channel assignment mechanism in accordance with the present invention, it should be observed that the invention resides primarily in a communication control mechanism that is resident in and executed by the control processor of an ISDN interface card, such as, but limited to a U-BRITE card. The ISDN interface card itself is comprised of conventional digital communication circuits and associated digital signal processing components and attendant supervisory control circuitry therefor, that controls the operations of such circuits and components, and is otherwise unaffected. Consequently, the configuration of such conventional circuits and components and the manner in which they are interfaced with other communication system equipment have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the an ISDN communication network in a convenient functional grouping, whereby the present invention may be more readily understood.

An embodiment of the DS0 channel assignment determination mechanism of the present invention will now be described with reference to the flow chart of FIG. 6. As pointed out briefly above, a given assumption is that, if a remote ISDN card is installed for a DSL time slot of interest, at least one bearer channel (which is the B1 channel if only one bearer channel is used) and the data (D) channel will be enabled for that DSL time slot.

At step 601, with the ISDN interface card in an idle state, a continuous stream of 'one' bits is supplied as data to be transmitted to each of the three available DS0 channels B1, D and B2, so that the cyclic redundancy check mechanism operating on each data stream will cause an 'all ones' associated code to be transmitted in the D octet portion of a respective DSL time slot of interest to a far end card that is potentially installed in the backplane card slot associated with the DSL time slot of interest. The multiplexing order of the DS0 time slots may be initially established at a prescribed default order, such as B1–D–B2, as shown in FIG. 3, described above, and as shown at step 602.

For this initial default order (B1–D–B2), the contents of the second DS0 time slot are monitored in step 603 to determine whether it contains a computed error detection code, such as a CRC code, expected to be returned over the D channel from the far end card. If the answer to query step 603 is YES, indicating that the second DS0 time slot is also used for D channel signalling by the far end card, then the routine branches to step 611, to determine whether or not the second bearer channel B2 is enabled for the third DS0 time slot, corresponding to the DS0 time slot triplet shown in FIG. 3. (As pointed out previously, it is customary industry practice that the B1 channel is assigned a DS0 time slot ahead of that of the B2 bearer channel, so that a YES answer to query step 603 implies that B2 channel, if used, will directly follow the D channel (which has been determined to occupy the second DS0 time slot, as shown in FIG. 3).

More particularly, when the routine branches to step 611, the all one's data previously asserted in the second bearer channel B2 is replaced with another prescribed (not all one's) data sequence. This replacement data sequence will cause the CRC operator in each of the transmitting card and the far end card to compute a new CRC code. In step 612, the D channel from the far end card is monitored for the return of a new CRC code which should match that computed on the not all ones data due to the change in the data being placed on the B2 channel. If the two CRC's match, namely there are no far end blocking errors (FEBE)—the answer to query step 612 is YES, then it is inferred that the DS0 channel assignments of the far end card correspond to those currently used by the near end card (e.g., B1–D–B2 in the present example) and the routine is completed or terminates at step 613. However, if far end blocking errors are detected (the answer to query step 612 is YES), it is inferred that the third available DS0 channel is not used by the far end card for B2 bearer channel signaling, the B2 channel is turned off in step 614, and the routine is completed at step 615.

If the answer to query step 603 is NO, indicating that the second DS0 time slot is not used for D channel signalling by the far end card, then it is inferred that the DS0 channel order shown in FIG. 4 of B1–B2–D is employed by the far end card, and the multiplexing order is rearranged in step 604 to reflect the new order. For this rearranged DS0 time slot order (B1–B2–D), the contents of the third DS0 time slot are monitored in step 605 to determine whether it contains the CRC data expected to be returned over the D channel from the far end card. If the answer to query step 605 is again YES, NO, indicating that the third DS0 time slot is used for D channel signalling by the far end card, then it is concluded that the DS0 channel assignment order is B1–B2–D, as shown in FIG. 4, and the routine is terminated in step 621.

However, if the answer to query step 605 is again NO, indicating that the third DS0 time slot is not used for D channel signalling by the far end card, then it is inferred that the DS0 channel order shown in FIG. 5 of D–B2 is employed by the far end card, and the multiplexing order is rearranged in step 606 to reflect this second alternative order. For this second alternative DS0 time slot order (D–B2), the contents of the first DS0 time slot of the returned DSL time slot of interest are monitored in step 607 to determine whether that first DS0 time slot contains the CRC data expected to be returned over the D channel from the far end card. If the answer to query step 607 is still NO, indicating a synchronization failure for each possible D channel time slot, it is concluded that there is no ISDN interface card installed at the remote or far end site for a DSL time slot of interest, and the process returns to step 602 and proceeds as described above for the next DSL time slot.

If the answer to query step 607 is YES, however, then in step 608, the B1 channel is disabled or turned off, and the routine branches to step 611 and proceeds as described above, to determine whether or not the second bearer channel B2 is enabled for the third DS0 time slot. As described above, if the answer to step 612 is NO (no far end blocking errors detected), then it is inferred that the that the DS0 channel multiplexing assignments of the far end card correspond to those as currently rearranged by step 606 (namely, D–B2 in the present example), and the routine is completed or terminates at step 613. However, if far end blocking errors are detected (the answer to query step 612 is YES), it is inferred that the third available DS0 channel is not used by the far end card for B2 bearer channel signaling, the B2 channel is turned off in step 614, and the routine is completed at step 615.

As will be appreciated from the foregoing description, the problem of potential misconfiguration of ISDN interface circuit cards, such as may result from the failure of a telecommunication service technician to properly set DS0 time slot option switches in accordance with their intended ISDN channel assignments, is effectively remedied in accordance with the present invention by means of a software-based automated DS0 channel multiplexing format analysis routine resident in the ISDN interface card's microcontroller. When exercised, this routine is operative to automatically determine not only what DS0 channels are available at the remote ISDN circuit card, but also the order in which those DS0 channels are multiplexed by that remote card's circuitry. As a consequence, once the routine has run to completion, each ISDN interface card will contain the same DS0 time slot multiplexing scheme—corresponding to what has been manually configured at a remote card—even if the remote card's DS0 option switches were originally incorrectly set.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but we intend to cover all such changes and modifications as are obvious to one of ordinary skill in the art.

What is claimed is:

1. For use with a time division multiplexed (TDM) communication network, wherein a respective digital subscriber line (DSL) time slot is subdividable into a plurality of variable assignment channel time slots for conveying communication signals between interface circuits coupled to said network, a method of automatically determining channel time slot availability and associated channel time slot transmission order that may be employed by a selected interface circuit for said respective DSL time slot, said method comprising the steps of:

(a) attempting to establish communications with said interface circuit in accordance with a first time slot transmission order of said plurality of channel time slots;

(b) in response to step (a) failing to establish communications between interface circuits of said network, iteratively attempting to establish communications with said selected interface circuit, in accordance with one or more respectively different time slot transmission orders of said plurality of channel time slots; and (c) in response to one of the time slot transmission orders employed in either of steps (a) or (b) successfully establishing communications with said selected interface circuit, determining which of said plurality of the variable assignment channel time slots of said one time slot transmission order may be used to conduct communications with said selected interface circuit.

2. A method according to claim 1, wherein step (c) comprises determining whether one of said plurality of the variable assignment channel time slots of said one time slot transmission order may not be used to conduct communications with said selected interface circuit.

3. A method according to claim 1, wherein step (c) comprises determining whether one of said plurality of the variable assignment channel time slots of said one time slot transmission order may be used to conduct communications with said selected interface circuit.

4. A method according to claim 1, wherein step (c) comprises disabling one of said plurality of the variable assignment channel time slots of said one time slot transmission order, and determining whether or not another of said plurality of the variable assignment channel time slots of said one time slot transmission order may be used to conduct communications with said selected interface circuit.

5. A method according to claim 1, wherein step (c) further comprises in response to none of the time slot transmission orders employed in either of steps (a) or (b) successfully establishing communications with said selected interface circuit, determining that there is no selected interface circuit coupled to said network for said respective DSL time slot.

6. A method according to claim 1, wherein said DSL time slot comprises an integrated services digital network (ISDN) DS1 time slot that is subdividable into a plurality of DS0 channel time slots comprised of first and second bearer channel (B1 and B2) time slots and a data channel (D) time slot.

7. A method according to claim 6, wherein each of steps (a) and (b) comprises determining said transmission order that may be employed by said selected interface circuit for said respective DSL time slot by monitoring a selected one of said plurality of DS0 channel time slots for presence of said data channel D time slot.

8. A method according to claim 7, wherein each of steps (a) and (b) comprises transmitting a prescribed signal sequence during said B1 and B2 time slot, generating an error detection correction code on said prescribed signal sequence, transmitting said error detection code to said interface circuit during said D channel time slot, and monitoring said selected one of said plurality of DS0 channel time slots within a return DSL time slot associated with said selected interface circuit for a far end blocking code.

9. A method according to claim 8, wherein said prescribe signal sequence comprises an 'all ones' bit sequence.

10. A method according to claim 7, wherein step (c) comprises, in response to one of the time slot transmission orders employed in either of steps (a) or (b) successfully establishing communications with said selected interface circuit, determining whether said B2 time slot may be used to conduct communications with said selected interface circuit.

11. A method according to claim 10, wherein step (c) comprises
(c1) transmitting a predetermined signal sequence during said B2 time slot,
(c2) generating an error detection code on said predetermined signal sequence,
(c3) transmitting said error detection code to said interface circuit during said D channel time slot,
(c4) monitoring contents of said D channel time slot within a DSL time slot associated with said selected interface circuit for a far end blocking, and
(c5) determining whether said B2 time slot may be used to conduct communications with said selected interface circuit based on the value of said far end blocking code.

12. A method according to claim 11, wherein step (c5) comprises determining that said selected interface circuit is provisioned to conduct communications during said B2 time slot in response to a first binary value of said far end blocking code.

13. A method according to claim 12, wherein step (c5) comprises determining that said selected interface circuit is not provisioned to conduct communications during said B2 time slot, in response to a second binary value of said far end blocking code.

14. An automated DS0 channel multiplexing format analysis routine resident in a communications controller of a respective integrated services digital network (ISDN) interface circuit of an ISDN communications network, wherein a digital subscriber line (DSL) time slot is subdividable into DS0 bearer and data channel time slots for conveying ISDN communication signals between said respective ISDN interface circuit and another ISDN interface circuit coupled to said network, said automated DS0 channel multiplexing format analysis routine being operative to automatically perform the following steps:
determine what DS0 channels are available at said another ISDN circuit, and also an order in which said DS0 channels are multiplexed by said another ISDN circuit, and
automatically configure said respective ISDN interface circuit with a DS0 time slot multiplexing format of said another ISDN circuit.

15. An automated DS0 channel multiplexing format analysis routine according to claim 14, wherein said another ISDN interface circuit comprises a Basic Rate Interface Transmission Extension ISDN interface circuit.

16. An automated DS0 channel multiplexing format analysis routine according to claim 14, wherein said respective interface circuit comprises a U-Basic Rate-One Transmission Extension (U-BRITE) ISDN interface circuit.

17. For use with a time division multiplexed (TDM) communication network, wherein a respective digital subscriber line (DSL) time slot is subdividable into a plurality of variable assignment channel time slots for conveying communication signals between first and second interface circuits coupled to said network, a communication control mechanism installed in a communications controller of said first interface circuit which, when executed, is operative to automatically determine channel time slot availability and associated channel time slot transmission order that may be employed by second interface circuit for said respective DSL time slot, said communication control mechanism performing the steps of:
(a) attempting to communicate with said second interface circuit for a first time slot transmission order of said plurality of channel time slots;
(b) in response to failing to communicate with said interface circuit in step (a), iteratively attempting to communicate with said second interface circuit, using one or more respectively different time slot transmission orders of said plurality of channel time slots; and
(c) in response to successfully communicating with said second interface circuit in either of steps (a) or (b), determining which of said plurality of the variable assignment channel time slots said second interface circuit is provisioned to use.

18. A communication control mechanism according to claim 17, wherein step (c) comprises determining whether second interface circuit is provisioned to use a selected one of said plurality of the variable assignment channel time slots.

19. A communication control mechanism according to claim 17, wherein step (c) comprises determining whether second interface circuit is not provisioned to use one of said plurality of the variable assignment channel time slots.

20. A communication control mechanism according to claim 17, wherein step (c) comprises disabling one of said plurality of the variable assignment channel time slots, and determining whether said second interface circuit is provision to use another of said plurality of the variable assignment channel time slots.

21. A communication control mechanism according to claim 17, wherein step (c) further comprises in response to neither of steps (a) or (b) successfully communicating with said second interface circuit, determining that there is no second interface circuit coupled to said network for said respective DSL time slot.

22. A communication control mechanism according to claim 17, wherein said DSL time slot comprises an integrated services digital network (ISDN) DS1 time slot that is subdividable into a plurality of DS0 channel time slots comprised of first and second bearer channel (B1 and B2) time slots and a data channel (D) time slot.

23. A communication control mechanism according to claim 22, wherein said second interface circuit comprises a Basic Rate Interface Transmission Extension ISDN circuit.

24. A communication control mechanism according to claim 23, wherein said first interface circuit comprises a U-Basic Rate-One Transmission Extension (U-BRITE) ISDN circuit.

25. A communication control mechanism according to claim 22, wherein each of steps (a) and (b) comprises determining said transmission order that may be employed by said second interface circuit for said respective DSL time slot by monitoring a selected one of said plurality of DS0 channel time slots for presence of said data channel D time slot.

26. A communication control mechanism according to claim 25, wherein each of steps (a) and (b) comprises transmitting a prescribed signal sequence during said B1 and B2 time slots, generating an error detection code on said prescribed signal sequence, transmitting said error detection code to said interface circuit during said D channel time slot, and monitoring said selected one of said plurality of DS0 channel time slots within a return DSL time slot associated with said second interface circuit for the return of a far end blocking code.

27. A communication control mechanism according to claim 26, wherein said prescribed signal sequence comprises an 'all ones' bit sequence.

28. A communication control mechanism according to claim 25, wherein step (c) comprises, in response to one of the time slot transmission orders employed in either of steps (a) or (b) successfully establishing communications with said second interface circuit, determining whether said B2 time slot may be used to conduct communications with said second interface circuit.

29. A communication control mechanism according to claim 28, wherein step (c) comprises
   (c1) transmitting a predetermined signal sequence during said B2 time slot,
   (c2) generating an error detection code on said predetermined signal sequence,
   (c3) transmitting said error detection code to said interface circuit during said D channel time slot,
   (c4) monitoring contents of said D channel time slot within a DSL time slot associated with said second interface circuit for a returned far end blocking code, and
   (c5) determining whether said second interface circuit is provisioned to conduct communications during said B2 time slot in accordance with the value of said far end blocking code.

30. A communication control mechanism according to claim 29, wherein step (c5) comprises, in response to a first binary value of said far end blocking code, determining that said second interface circuit is provisioned to conduct communications during said B2 time slot.

31. A communication control mechanism according to claim 30, wherein step (c5) comprises, in response to a second binary value of said far end blocking code, determining that said second interface circuit is not provisioned to conduct communications during said B2 time slot.

* * * * *